(No Model.)
E. M. BARNES.
FRICTION CLUTCH.
No. 462,659. Patented Nov. 3, 1891.
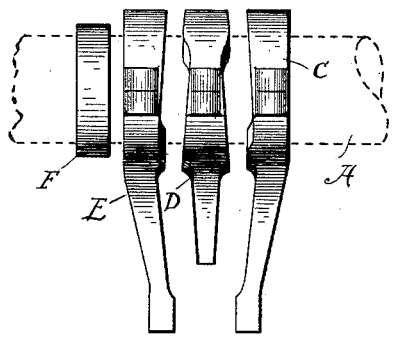
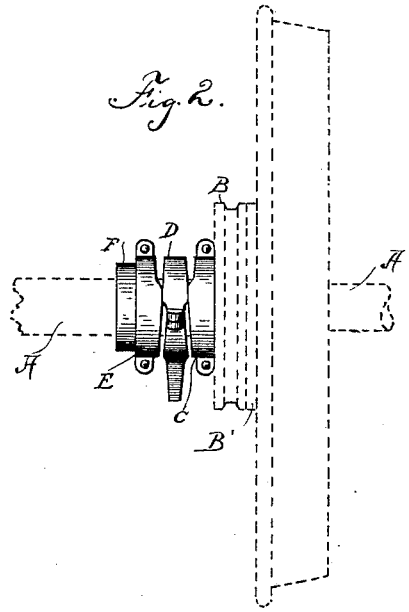
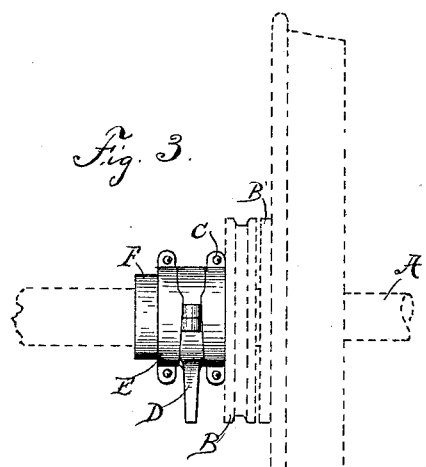
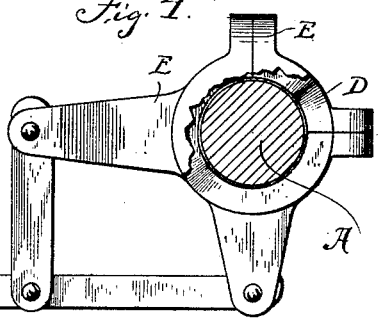
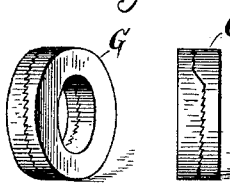
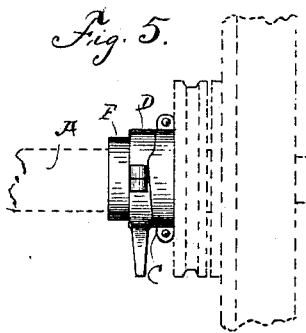
Witnesses.
Inventor:
Edward M. Barnes

UNITED STATES PATENT OFFICE.

EDWARD M. BARNES, OF CLEVELAND, OHIO, ASSIGNOR OF ONE-HALF TO JOHN A. DAVIES, OF SAME PLACE.

FRICTION-CLUTCH.

SPECIFICATION forming part of Letters Patent No. 462,659, dated November 3, 1891.

Application filed January 9, 1891. Serial No. 377,226. (No model.)

*To all whom it may concern:*

Be it known that I, EDWARD M. BARNES, of Cleveland, in the county of Cuyahoga and State of Ohio, have invented certain new and useful Improvements in Friction-Clutches; and I do hereby declare the following to be a full, clear, and exact description of the invention, such as will enable others skilled the art to which it pertains to make and use the same.

My invention relates to a friction-clutch device adapted for use in car-brakes or in any other place where friction-gear is employed; and it consists in certain novel features of construction and combinations of parts, as will be hereinafter described, and pointed out in the claims.

In the drawings, Figure 1 represents the parts of my device separated, but placed in their proper relation with each other to show the cam construction of the rings. Fig. 2 shows the same placed together as designed for operative purposes in their position with the clutch released; Fig. 3, the same with the parts in their position with the clutch applied. Fig. 4 is a view in side elevation of my device as applied to a street-car axle. Fig. 5 shows a modified construction of my invention, and Figs. 6 and 7 are views of the adjusting-ring G.

I shall describe my invention as applicable to street-car axles for braking purposes, although I wish it to be understood that I do not limit my invention to such use, as it is manifestly adaptable as a friction or clutch mechanism in pulleys and gears for shop and other uses.

A represents the wheel-axle of a street-car. Placed upon this axle and firmly fixed thereon is a friction-plate B'. Facing and next adjacent to the fixed plate B', but loosely fitted upon the axle A, is the friction plate or disk B, upon which a chain, rope, or cable is wound for pulling upon the brake apparatus.

C is a cam-ring fitted loosely upon the shaft A and allowed both a rotary and lateral movement upon said axle. In other words, the axle A is allowed to revolve freely within the ring C, and at the same time said ring is permitted a lateral or sliding motion upon the axle.

D is a central cam-ring also fitted upon the axle A in the same way as the ring C.

E is another cam-ring, which, like the rings D and C, is loosely fitted upon its axle.

F is a collar firmly fitted upon the axle A and serving as an abutment to the rings C, D, and E and the friction plate or disk B.

Attached to or formed integral with the central cam-ring D is an arm for the attachment of any suitable link and lever or other connections, whereby the ring D can be manually turned upon the axle A, so as to apply or to release the friction apparatus.

I do not limit myself in any degree to the particular arrangement or construction of the mechanism connecting the central ring D with the operator, as this may be manifestly varied indefinitely to suit special requirements. It will be apparent that the connections between the actuating-arm of the central ring D and the operator will effectually prevent that ring from rotating with the axle A, and that said axle will be permitted free movement within said ring while it is thus held against rotation, and the engagement between this central ring D and its rings C and E is such that all three of the rings C, D, and E are prevented from rotating with the axle A because the ring D is held, as already described. The engaging-faces of the rings C, D, and E are made cam-shaped, substantially as indicated in the drawings, so that by turning the ring D in one way or the other the ring C will be moved out or in and the friction thereby applied or released.

One modification of which my invention is susceptible consists in doing away with the ring E and setting the fixed abutment-ring F against the cam-ring D. In case of such modification the turning of the ring D in one direction or the other would operate to apply or to release the clutch on account of the cam construction and connections between the rings C D.

Figs. 6 and 7 of the drawings illustrate my adjusting-ring G, whereby I can adjust my apparatus to accommodate wear and tear or to determine the amount or degree of friction that shall result from a given amount of throw or motion of the actuating-arm associated with the ring D.

It will be seen that the adjusting-ring G is made in two parts and that the engaging-faces are serrated and have a diagonal or beveled conformation, so that by merely turning one of the parts of this ring its thickness can be made greater or less. I place the adjusting-ring G preferably next within the abutment F. With this provision I am enabled by the proper adjustment of this ring in the manner already shown to crowd the members of my apparatus more or less closely together to effect the results already pointed out. In many cases this would be a more ready and convenient method than a resetting of the abutment F, or by adding or subtracting washers or the like, through which means the same result might be more laboriously accomplished.

What I claim as my invention is—

1. The combination, with a shaft or axle having fixed abutments thereon and a pulley loosely mounted on the axle, of three cam-rings loosely mounted on the shaft or axle between the pulley and one of the abutments, and levers and links connected with the cam-rings, whereby the center one and the outside ones are moved simultaneously in opposite directions, substantially as set forth.

2. The combination, with an axle having wheels secured thereon, one wheel having a friction disk or surface inside, a fixed abutment on the shaft, and a pulley loosely mounted on the axle adjacent to the friction-surface, of cam-rings loosely mounted between the pulley and fixed abutment, and levers and links connected with the cam-rings, whereby they are operated simultaneously, substantially as set forth.

In testimony whereof I sign this specification, in the presence of two witnesses, this 22d day of December, 1890.

EDWARD M. BARNES.

Witnesses:
C. H. DORER,
WARD HOOVER.